April 7, 1964   F. F. DAVIS   3,127,944
DRILLING SAW

Filed Sept. 4, 1959   4 Sheets-Sheet 1

INVENTOR.
FRANK F. DAVIS
BY Lothrop & West

April 7, 1964 F. F. DAVIS 3,127,944
DRILLING SAW
Filed Sept. 4, 1959 4 Sheets-Sheet 2

INVENTOR.
FRANK F. DAVIS
BY Lothrop & West

April 7, 1964 F. F. DAVIS 3,127,944
DRILLING SAW

Filed Sept. 4, 1959 4 Sheets-Sheet 3

INVENTOR.
FRANK F. DAVIS
BY *Lothrop & West*

April 7, 1964     F. F. DAVIS     3,127,944
DRILLING SAW
Filed Sept. 4, 1959     4 Sheets-Sheet 4
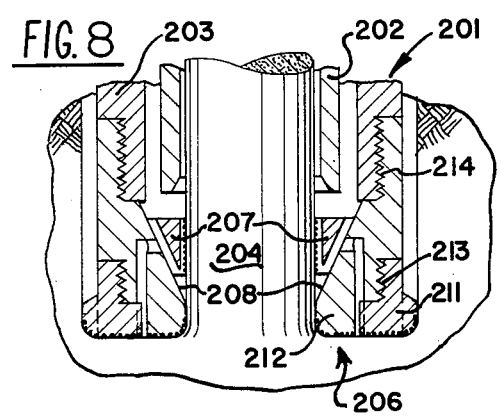
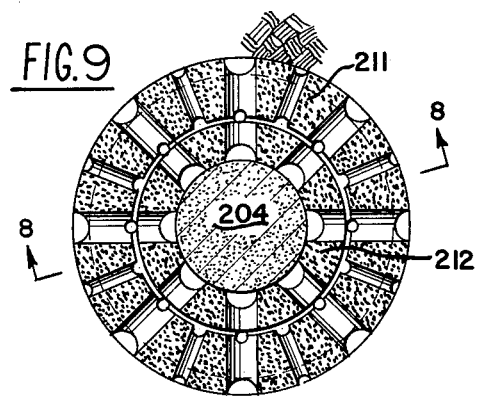
INVENTOR.
FRANK F. DAVIS
BY *Lothrop & West*

United States Patent Office 3,127,944
Patented Apr. 7, 1964

3,127,944
DRILLING SAW
Frank F. Davis, 2170 Markham Way, Sacramento, Calif.
Filed Sept. 4, 1959, Ser. No. 838,105
2 Claims. (Cl. 175—329)

The invention relates to improvements in earth and rock drilling equipment.

Diamond drills have been long and successfully used, particularly where holes of relatively small diameter have been desired. In the case of larger holes, drilling heads having diamond points set therein have also been utilized.

In the latter situation, however, the unitary or integral drilling heads heretofore employed have often required the use, in each head, of thousands of dollars worth of carats. Not only does this require a large capital investment, but where drilling is being carried on at a remote location, and the diamond-set drilling head requires repair, the head must be removed in its entirety and shipped to the manufacturer or other distant repair center. The operator using these unitary heads is consequently faced with the alternative of shutting down until repair is effected or of maintaining a bank of several heads, both involving a high capital outlay to the operator.

It is therefore an object of the invention to provide a drilling saw which has several drilling portions, each of which can be separately removed for repair.

It is another object of the invention to provide a drilling saw which operates efficiently with fewer carats of diamonds than presently used solid heads.

It is a further object of the invention to provide a drilling saw which gives excellent passageway to the flow of drilling fluids.

It is yet a further object of the invention to provide a drilling saw in which the drilling members are interchangeable.

It is still a further object of the invention to provide a drilling saw which reduces substantially the shipping weight and costs as contrasted with presently used drills of the solid or integral variety.

It is a yet further object of the invention to provide a drilling saw which cuts in a highly efficient manner and with a reduced amount of wear and scouring.

It is another object of the invention to provide a generally improved drilling saw.

Other objects, together with the foregoing, are attained in the embodiments described in the following description and shown in the accompanying drawings, in which:

FIGURE 8 is a median vertical section of the lower end of a core saw and core lifter form of the device, the plane of section being indicated by the line 8—8 in FIGURE 9; and FIGURE 9 is a bottom view of the form of device shown in FIGURE 8.

While the device of the invention is susceptible of numerous physical embodiments, depending on the environment and requirements of use, substantial numbers of the herein shown and described embodiments have been made and used and all have performed in a highly satisfactory manner.

Figure 1:
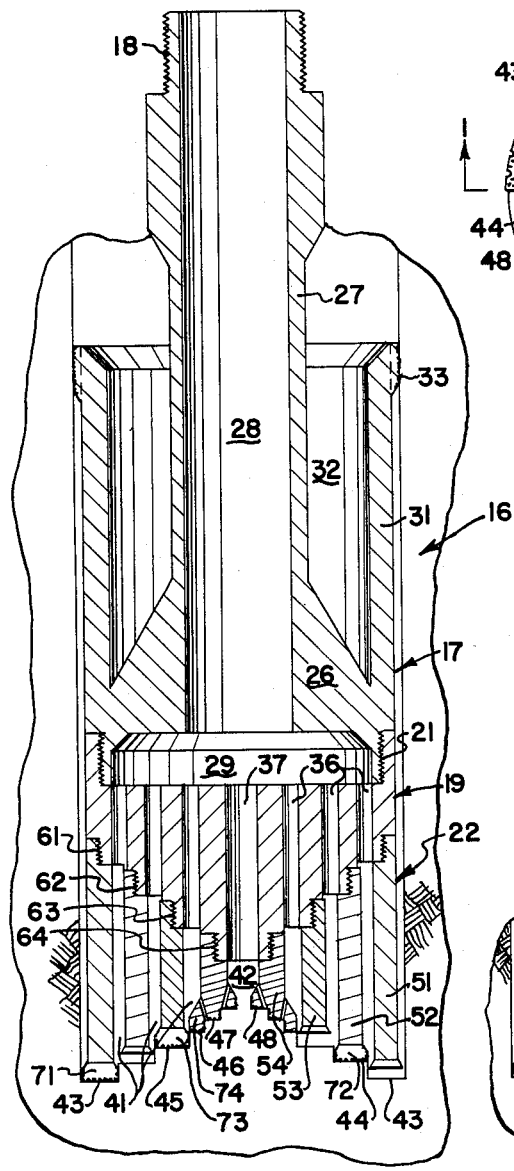
FIGURE 1 is a median vertical section of one form of drilling saw, the plane of section being indicated by the line 1—1 in FIGURE 2.
Figure 2:
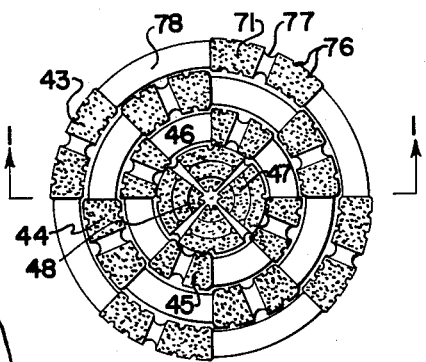
FIGURE 2 is a bottom elevation of the form of device shown in FIGURE 1.

Referring now to the form of device illustrated in FIGURES 1 and 2, it is seen that the saw unit, generally designated by the numeral 16, includes an upper member, termed a combination sub and detritus trap 17, which is engageable, as by threads 18, with a conventional drill pipe or collar (not shown). An intermediate member, called an adapter sub 19, is engageable, by threads 21, with the member 17 and, in turn, is engaged by a plurality of spaced concentric saw rings, collectively termed a drilling head 22, or saw.

The combustion sub and detritus trap 17 is described in more detail in my copending application, Serial No. 817,295, filed June 1, 1959, now abandoned, and includes a main body portion 26 depending from a tube 27 having a central bore 28 opening at its lower end into a manifold chamber 29 to conduct and disperse radially the drilling fluid used in connection with the drilling or sawing operation. Upstanding from the periphery of the body 26 is a collar 31 spaced from the tube 27 and defining therewith an annular chamber, termed a detritus trap 32, into which falls the larger and heavier debris generated by the sawing operation and carried upwardly by the drilling fluid as the fluid ascends from the cutting head toward the surface of the ground. In other words, while the lighter cuttings are carried upwardly to the surface, the heavier particles upon being lifted upwardly and past the fluted, diamond-set reamer 33 drop downwardly into the trap 32. From time to time, the string is lifted and the trap is emptied.

Formed in the adapter sub 19 is a plurality of vertical openings 36, including a somewhat larger central opening 37 adapted to conduct the drilling fluid downwardly from the manifold chamber 29 to the sawing unit 22 and thence through a plurality of concentric annular passageways 41, and a central bore 42, in the saw unit 22 to the diamond-set cutting faces 43, 44, 45, 46, 47 and 48 of the saw unit.

The annular passageways 41 are defined by a plurality of spaced substantially annular rings 51, 52, 53 and 54, counting from the outermost ring inwardly, the ring 54 being conveniently of the stepped variety shown most clearly in FIGURES 1 and 2. Each of these rings is engageably mounted on the adapter sub by corresponding threads 61, 62, 63 and 64. Owing to the fact that each of the respective cutting saws 71, 72, 73 and 74, formed at intervals around the bottom of the corresponding rings, is dimensioned so as not to interfere with the adjacent saws, each of the individual rings can be threadably mounted on or disengaged from the adapter sub in separate and individual fashion. While FIGURE 2 indicates a certain amount of interference between the matrices or cutting faces of adjacent rings, as, for example, faces 43 and 44, it is clearly to be understood that in actual practice there is no such interference. Instead, the inner envelope, or curved plane defining the inner margin of the matrix 43, for example, would be displaced slightly outwardly, radially, from the outer envelope of the matrix 44. In turn, the envelope of the inner margin of the matrix 44 would be spaced from the outer envelope of the matrix 45, and so on.

Consequently, if any one of the cutting faces is worn and needs resetting of its diamond points mounted in the matrix forming part of the saw, the particular ring bearing such worn cutting face can be removed and replaced without disturbing the balance of the annular saws. The savings in time and money resulting from this type of replacement, as contrasted with the solid cutting head situation, is apparent.

Furthermore, owing to the profusion of drilling fluid passageways, both of the smaller vertical variety 76 and the larger radial variety 77 (see FIGURE 2), as well as the segmental interruptions or gaps 78 between the various cutting faces on the bottoms of the rings, a very substantial fluid flow is maintained, thus assuring a constant flushing away of the sawed debris. While FIGURE 2 shows the various saw faces of the various rings in a more or less symmetrical pattern, it will be realized that in actual practice the saws in adjacent rings ordinarily will assume a random arrangement. The corresponding fluid passageways will, in this random situation, also be disposed in random fashion and thus produce, in conjunction with the rotation of the saws, as cutting proceeds, a highly turbulent and effective flushing operation.

Figure 4:
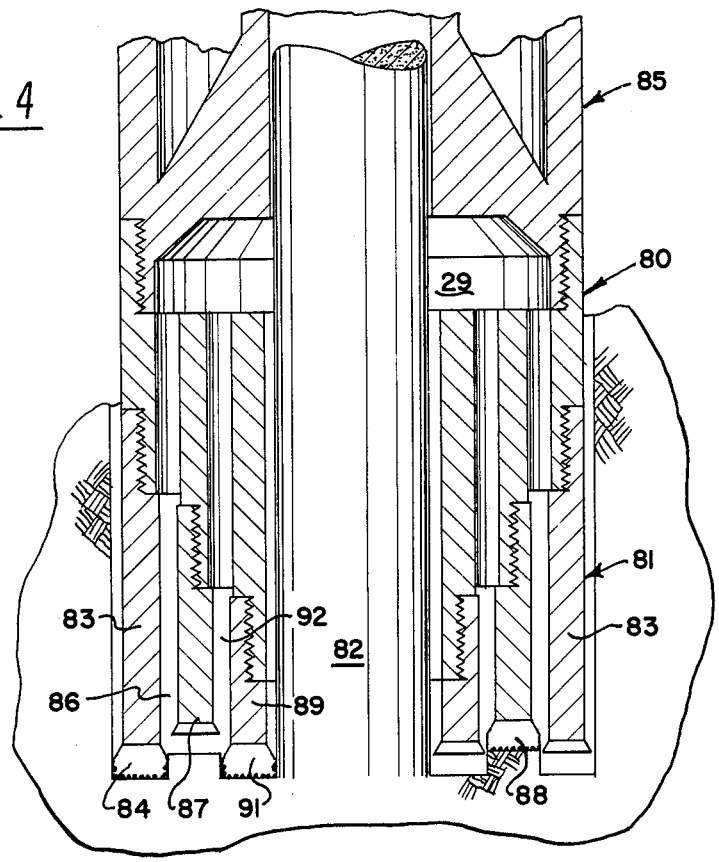
FIGURE 4 is a median vertical section of another form of the device of the invention illustrating its use in drilling a core, the plane of section being indicated by the line 4—4 in FIGURE 5.
Figure 5:
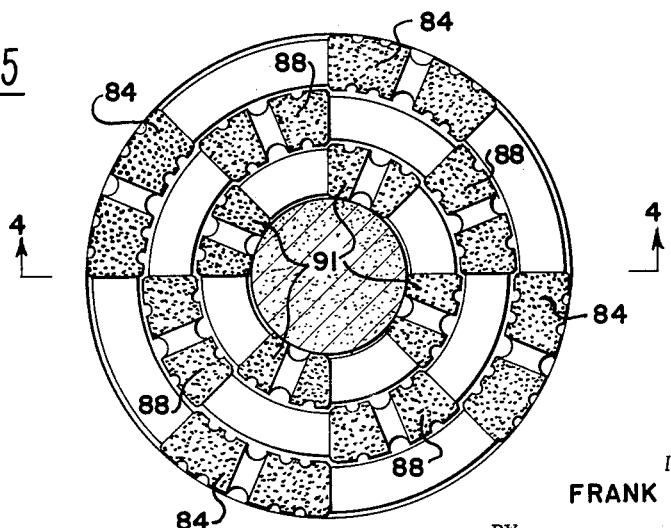
FIGURE 5 is a bottom view of the form of device shown in FIGURE 4.

FIGURES 4 and 5 most clearly illustrate a modified form of cutting head 81 mounted on an adapter sub 80 which, in turn, is screwed to a combination sub and detritus trap 85 comparable to the kind heretofore shown and described. The modified form of cutter, however, instead of cutting all of the rock in the stepped fashion shown most clearly in FIGURE 1, is especially adapted to cut a core 82. An outer annular ring 83 having around its bottom margin a plurality of cutting saws 84 is separated by an annular chamber 86 from a middle ring 87 which also has adjacent its bottom a plurality of radially enlarged saws 88, each having on its cutting face a plurality of small diamonds, or other hardened points, set in a matrix. In turn, the middle ring 87 is separated from an inner ring 89, with its saws 91, by an annular space 92.

It will be noted that despite the width of the saws 84, 88 and 91, the envelope of none interferes with the envelope of the adjacent saws. Consequently, there is freedom to remove and replace each of the rings independently of the others. Likewise of importance in this modification, as well as in all of the forms of the device, is the profusion of drilling fluid passageways. The vertical displacement, each from the other, of adjacent saws and the interrupted arrangement of the saws on each of the rings also assists greatly in assuring a free and uninterrupted flow of fluid and a consequent rapid and thorough flushing at the cutting faces.

Figure 6:
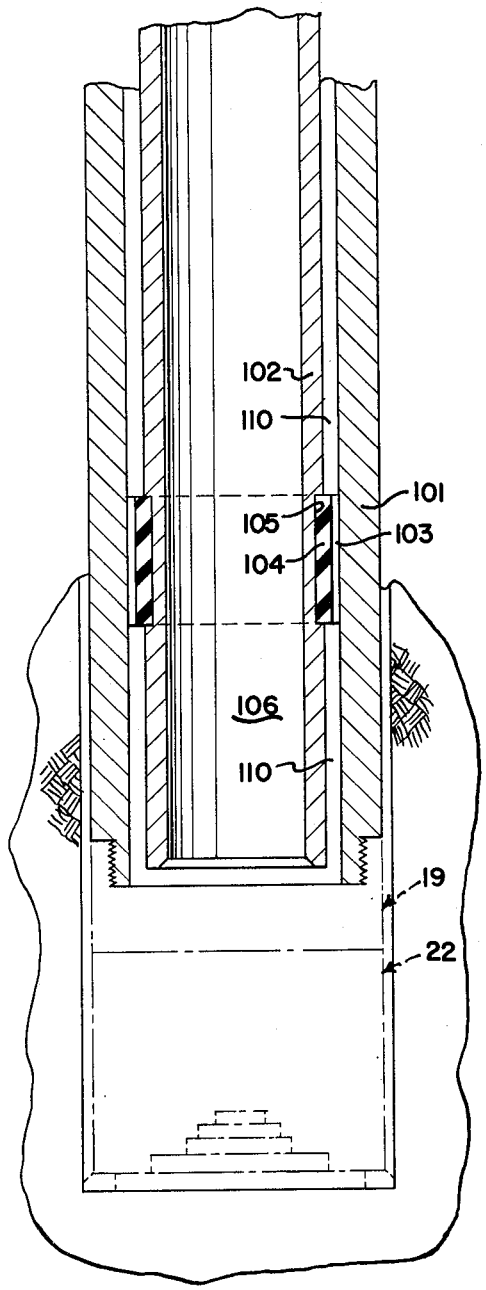
FIGURE 6 is a side elevational view of the type of drilling head illustrated in FIGURE 1, but with the head mounted on the lower end of an outer tube core barrel, a portion of the view being shown in section.
Figure 7:
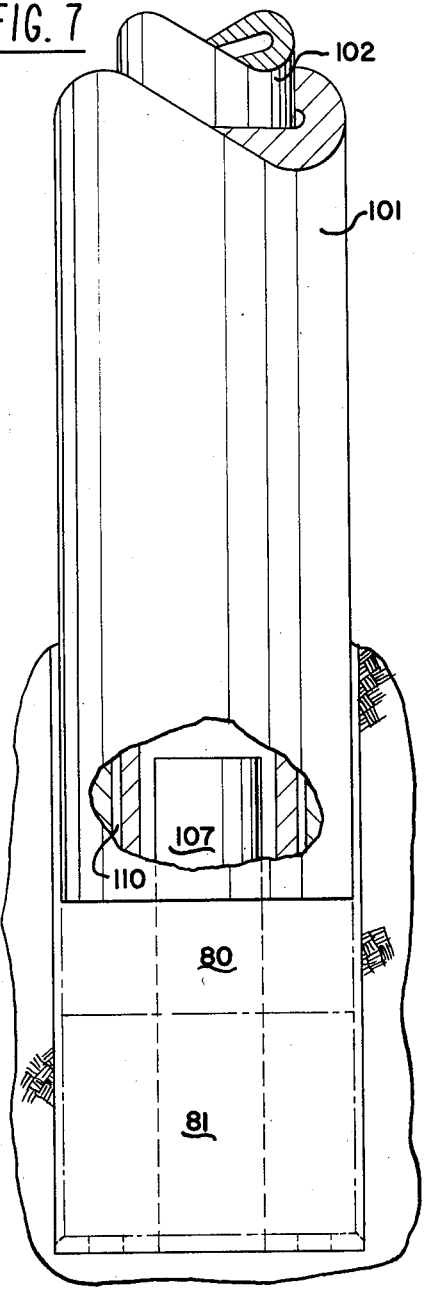
FIGURE 7 is a view somewhat comparable to that of FIGURE 6 but showing the core bit type of head shown in FIGURE 4 mounted on the lower end of an outer tube core barrel, FIGURE 7 being a companion view of FIGURE 6 to emphasize the interchangeability of the attachments.

FIGURES 6 and 7 are included to illustrate the versatility, adaptability and interchangeability of the various members to meet a wide variety of situations.

FIGURE 6, for example, illustrates the cutting unit 22, of the kind shown in FIGURE 1, mounted on the adapter 19 which, in this case, is in threaded engagement with a rotatable outer tube core barrel 101 separated from a non-rotating inner tube core barrel 102 by a vertically fluted, as by flutes 103, hard rubber collar 104 disposed within an annular recess 105 in the inner tube 102. As drilling proceeds, the head 22 cuts all of the rock which is flushed away by the drilling fluid moving downwardly through the passage 106. Then, should it be desired to take a core sample, the sub 19 is replaced by the sub 80 and the head 22 is replaced by the core drilling head 81 (shown in FIGURES 4 and 5) and a core 107, as shown in FIGURE 7, is thereupon sawed. In this situation, the drilling fluid moves downwardly through the annular chamber 110. This interchangeability of cutting heads is believed to be unique in the art and leads to great flexibility of operations.

Figure 3:
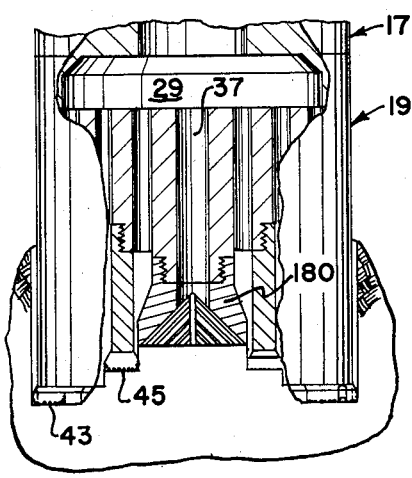
FIGURE 3 is a median vertical section of the lower portion of the form of device shown in FIGURE 1, but with a rock bit installed in place of the center circular saw.

It is also to be noted, by reference to FIGURES 1 and 3, that a rock bit 180 can be substituted for the center saw 54 shown in FIGURE 1, it being necessary only to disengage the saw 54 from the threads 64 and screw on the rock bit 180. A rock bit is highly effective and surprisingly durable where, as in FIGURE 3, the bit need only grind off the top of a column or core formed by the encompassing circular diamond-set saws. In other words, rock bits in hard formations have a very limited life because they quickly lose their ability to maintain the gauge of the hole. Where, as here, however, the bit does not have to maintain the gauge (this being effected by the diamond saws) and its only purpose is to grind the center core, its life is greatly extended.

FIGURES 1 and 3 again illustrate the great flexibility inherent in the various forms of the present invention, enabling the operator to interchange parts not only for purposes of replacement of worn members but also to attack the formation being drilled with a variety of cutting forms.

This concept is also illustrated in FIGURES 8 and 9 wherein a core-lifter 201, comprising a fixed inner tube core barrel 202 and a rotatable outer tube 203, encompasses a core 204 formed by a cutting head 206.

The construction and operation of the diamond-set plurality of arcuate wedges 207 slidably disposed in a conical cavity 208 is described in detail in my copending application heretofore identified. In the form shown in FIGURES 8 and 9, however, the cutting head 206 is formed into separate, interchangeable members, an outer member 211 and an inner member 212. The outer member is engageable with threads 213 on the inner member 212, and, in turn, the latter can be connected by threads 214 to the rotatable outer tube 203. Replacement of worn or broken cutting heads can therefore easily be made. As in the previously shown and described saws, numerous channels, both vertical and radial, are provided for the copious flow of drilling fluids.

It can therefore be seen that I have provided, in all instances, a cutting member whose components are easily interchangeable and replaceable, and in which high cutting efficiency is at all times maintained.

What is claimed is:

1. A drilling saw adapted for attachment to the bottom end of a drill pipe, said saw comprising:
   (a) an adapter sub having on its lower end a plurality of concentric threaded annular members in stepped relation, said hub being also provided with a plurality of openings extending from the upper end of said sub to each of said stepped annular members;
   (b) a plurality of annular rings in threaded engagement with said annular members on said sub, said rings being spaced apart to define a plurality of concentric annular passageways, said passageways being in communication with said plurality of openings in said sub; and
   (c) a plurality of diamond-set matrices mounted on the bottom ends of said annular rings, said matrices being larger in a radial dimension than said rings, said matrices thereby extending laterally into the adjacent of said annular passageways and into the path of drilling fluid descending through said annular passageways.

2. A rock drilling device for attachment to the bottom of a drill pipe, said device comprising:
   (a) an adapter sub having on its lower end a plurality of screw threads, said sub having formed therein a central vertical opening and a plurality of openings connecting with said central opening and extending to the bottom of said sub at locations removed from said central opening and between said screw threads;
   (b) an annular ring in threaded engagement with the outermost of said screw threads;

(c) a diamond-set matrix on the bottom end of said annular ring, said matrix being larger in a radial dimension than said annular ring; and (d) a rock bit in threaded engagement with the innermost of said screw threads, the outer surface of said rock bit and the inner surface of the adjacent annular ring defining a passageway for the flow of drilling fluid to said matrix and the adjacent lower end of said rock bit, the lowermost portion of said rock bit being at an elevation above the lowermost portion of said matrix, and the outer periphery of said rock bit being in vertical non-interfering relation with respect to said matrix whereby said rock bit is independently removable.

References Cited in the file of this patent

UNITED STATES PATENTS

| | | |
|---|---|---|
| 122,514 | Bullock | Jan. 9, 1872 |
| 613,340 | Vollath | Nov. 1, 1898 |
| 1,831,841 | Brantly | Nov. 17, 1931 |
| 2,371,488 | Williams | Mar. 13, 1945 |
| 2,599,770 | Marcerou | June 10, 1952 |
| 2,648,524 | Dionisotti | Aug. 11, 1953 |
| 2,801,079 | Gress | July 30, 1957 |
| 2,830,795 | Center | Apr. 15, 1958 |
| 2,838,286 | Austin | June 10, 1958 |
| 2,862,691 | Cochran | Dec. 2, 1958 |
| 2,938,709 | Curtis | May 31, 1960 |